United States Patent
Kuratomi

[19]
[11] Patent Number: 5,871,841
[45] Date of Patent: Feb. 16, 1999

[54] MAGNETIC DISK MEDIUM

[75] Inventor: Isao Kuratomi, Tokyo, Japan

[73] Assignee: NEC Corporation, Tokyo, Japan

[21] Appl. No.: 738,455

[22] Filed: Oct. 30, 1996

[30] Foreign Application Priority Data

Nov. 14, 1995  [JP]  Japan .................................... 6-295771

[51] Int. Cl.⁶ ..................................................... G11B 5/66
[52] U.S. Cl. ...................... 428/332; 428/336; 428/694 T; 428/694 TS; 428/694 TP; 428/694 TC; 428/900
[58] Field of Search .................................... 428/336, 332, 428/694 T, 694 TS, 694 TP, 694 TC, 900

[56] References Cited

U.S. PATENT DOCUMENTS 5,562,982  10/1996  Hiwatashi ............................... 428/332

OTHER PUBLICATIONS

Kuratomi et al., "An Influence of Making Hydrogenated Carbon Protective Layer Thinner on CSS Durability", *Japan Society of Tribologists*, May 1995, pp. 85–88.

*Primary Examiner*—Leszek Kiliman
*Attorney, Agent, or Firm*—Young & Thompson

[57] ABSTRACT

A magnetic disk medium is improved in recording density by reducing strain within a protective layer caused by interaction between the magnetic layer and the protective layer. The invention provides a magnetic disk medium for recording information, including a substrate made of a non-magnetic material; a magnetic layer formed on the substrate; a buffer layer formed on the magnetic layer, the buffer being made of at least one of Si, Ge, Sn, Ti, Mo, and a protective layer formed on the buffer layer.

18 Claims, 7 Drawing Sheets

| EMBODIMENT 1 BUFFER LAYER: Si | PROTECTIVE LAYER SPACING LOSS | HC RATE | EMBODIMENT 2 BUFFER LAYER: Ge | PROTECTIVE LAYER SPACING LOSS | HC RATE | EMBODIMENT 3 BUFFER LAYER: Sn | PROTECTIVE LAYER SPACING LOSS | HC RATE |
|---|---|---|---|---|---|---|---|---|
| EMBODIMENT 1.1 | 14nm | 0/10 | EMBODIMENT 2.1 | 14nm | 0/10 | EMBODIMENT 3.1 | 14nm | 0/10 |
| EMBODIMENT 1.2 | 12nm | 0/10 | EMBODIMENT 2.2 | 12nm | 0/10 | EMBODIMENT 3.2 | 12nm | 0/10 |
| EMBODIMENT 1.3 | 10nm | 0/10 | EMBODIMENT 2.3 | 10nm | 0/10 | EMBODIMENT 3.3 | 10nm | 0/10 |
| EMBODIMENT 1.4 | 8nm | 0/10 | EMBODIMENT 2.4 | 8nm | 0/10 | EMBODIMENT 3.4 | 8nm | 0/10 |
| EMBODIMENT 1.5 | 6nm | 0/10 | EMBODIMENT 2.5 | 6nm | 0/10 | EMBODIMENT 3.5 | 6nm | 3/10 |
| EMBODIMENT 4 BUFFER LAYER: Ti | PROTECTIVE LAYER SPACING LOSS | HC RATE | EMBODIMENT 5 BUFFER LAYER: Mo | PROTECTIVE LAYER SPACING LOSS | HC RATE | EMBODIMENT 6 BUFFER LAYER: W | PROTECTIVE LAYER SPACING LOSS | HC RATE |
| EMBODIMENT 4.1 | 14nm | 0/10 | EMBODIMENT 5.1 | 14nm | 0/10 | EMBODIMENT 6.1 | 14nm | 0/10 |
| EMBODIMENT 4.2 | 12nm | 0/10 | EMBODIMENT 5.2 | 12nm | 0/10 | EMBODIMENT 6.2 | 12nm | 0/10 |
| EMBODIMENT 4.3 | 10nm | 0/10 | EMBODIMENT 5.3 | 10nm | 0/10 | EMBODIMENT 6.3 | 10nm | 0/10 |
| EMBODIMENT 4.4 | 8nm | 0/10 | EMBODIMENT 5.4 | 8nm | 0/10 | EMBODIMENT 6.4 | 8nm | 0/10 |
| EMBODIMENT 4.5 | 6nm | 1/10 | EMBODIMENT 5.5 | 6nm | 2/10 | EMBODIMENT 6.5 | 6nm | 0/10 |

| COMPARATIVE EXAMPLE NO BUFFER LAYER | PROTECTIVE SPACING LOSS | HC RATE |
|---|---|---|
| COMPARATIVE EXAMPLE 1.1 | 14nm | 0/10 |
| COMPARATIVE EXAMPLE 1.2 | 12nm | 0/10 |
| COMPARATIVE EXAMPLE 1.3 | 10nm | 4/10 |
| COMPARATIVE EXAMPLE 1.4 | 8nm | 9/10 |
| COMPARATIVE EXAMPLE 1.5 | 6nm | 10/10 |

FIG. 9

MAGNETIC DISK MEDIUM

BACKGROUND OF THE INVENTION

1. Field of the Invention

The present invention relates to a magnetic disk medium, and particularly to a magnetic disk medium of a magnetic disk unit which is an external storage apparatus of a computer.

2. Description of the Related Art

In a conventional magnetic disk unit, a magnetic disk medium is used as a storage medium. A magnetic head in a stationary state contacts the magnetic disk medium when the disk unit is power-off, slides on the magnetic disk medium as the magnetic disk medium rotates when starting up, and then floats up by an air flow generated between the magnetic head and the magnetic medium and performs a read/write operation in the floating state.

This is called a contact start stop system (CSS system) and is adopted in many kinds of magnetic disk units.

Such a magnetic disk medium comprises an underlayer 2, a magnetic layer 3, a protective layer 4, and a lubricant 5 each made of a thin film provided one after another on a non-magnetic substrate 1, as shown in FIG. 4. The protective layer 4 is formed for the purpose of protecting the magnetic layer 3 from corrosion caused by an external environment and from wear due to sliding contact with a magnetic head in a CSS system, and the like.

Although various kinds of materials such as amorphous carbon, $SiO_2$, SiC, $ZrO_2$, and the like have been proposed as a material of the protective layer 4, the most popular material is a material belonging to an amorphous carbon system, which is widely used in a state where it is improved in mechanical strength by adding hydrogen to it.

In order to increase recording density, it is important to reduce a magnetic spacing between a magnetic head and a magnetic disk medium in read and write operations. The magnetic spacing is the distance between a magnetic layer of a magnetic disk medium and a recording/readout element of a magnetic head. Since the magnetic spacing includes also the thickness of the protective layer 4, it is desired to make the protective layer 4 thinner. However, when the protective layer 4 is made thinner, there results degradations of the magnetic layer 3 in corrosion resistance and wear durability.

Therefore, the present inventor reviewed how thin the protective layer can be made, for a protective layer made of conventional hydrogenated carbon. The result of the review was reported in Kuratomi et al., "An influence of making hydrogenated carbon protective layer thinner on CSS durability" Japan Society of Tribologists, the Proceeding of Tribology Conference, Tokyo, May, 1995, pages 85–88.

It was made clear that, when the thickness of protective layer decreased from 10 nm to 5 nm, wear characteristics of the protective layer change substantially and it cannot keep sufficient wear durability against sliding contact with the magnetic head during start-up and stop period in contact start stop systems.

As a result, it was found, wear proceeded rapidly and CSS (Contact Start Stop) durability of a magnetic disk medium degraded rapidly.

It was also demonstrated that substantial degradation of wear durability at 5 nm of protective layer thickness was caused by an internal stress distribution of the protective layer in the direction of layer thickness, and a degradation mechanism by internal stress was proposed.

That is, an internal stress of thin film is generated by internal strain such as a deviation of mutual location of atoms or microscopic clusters.

When amorphous carbon system material is formed on a magnetic layer made of magnetic metal alloy, the protective layer is heavily influenced by interaction with the magnetic layer, such as by the difference of thermal expansion coefficient or the like and the effect of interface mismatching. Therefore, a protective layer directly overlying the magnetic layer yields large strain in the "in-plane" direction perpendicular to layer thickness (hereafter in-plane).

Accordingly, as the protective layer thickness increases and a distance of the read-out head from the interface of magnetic layer becomes larger, the strain is relaxed and the amount of in-plane strain steadily decreases toward a value of about "0" as shown in FIG. 1.

As a result, in-plane internal stress is large in a domain adjacent to magnetic layer due to the in-plane strain, while in-plane internal stress is relieved at a longer distance than a certain layer thickness, because in-plane strain is relaxed. According to the measurement result of stress vs. the layer thickness, in the conventional protective layer, in-plane compression internal stress is large within 5 nm of the interface of the magnetic layer, while in an area at a distance of more than 10 nm from the interface of the magnetic layer, in-plane compression internal stress is almost non-existent compared with the area within 5 nm of the interface of magnetic layer.

A thickness of about 20 nm is adopted as the thickness of the protective layer 4 of a conventional magnetic disk medium, and this thickness is enough to achieve good wear durability; however, since a thickness of the protective layer of 20 nm causes magnetic spacing to be too big, it is needed to make the protective layer thinner in order to increase recording density.

Since a conventional protective layer 4 degrades remarkably in its own wear durability, when the layer thickness is reduced to 10 nm or less, it cannot keep a sufficient wear durability against a magnetic head when starting and stopping a disk unit of CSS system and is liable to damage the magnetic layer 3.

SUMMARY OF THE INVENTION

An object of the present invention is to provide a magnetic disk medium which is improved in recording density by providing a protective layer of 10 nm or less in thickness which has a sufficient wear durability as well as by reducing a magnetic spacing loss between a magnetic layer and a lubricant through improving the above-mentioned disadvantages of an existing example of the prior art, reducing strain caused by interaction between the magnetic layer and the protective layer, and reducing thickness of the protective layer without degrading its wear durability by reducing the extent and rate of change of in-plane strain in the layer thickness direction.

In order to achieve the above-mentioned object, the invention provides a magnetic disk medium for recording information comprising: a substrate made of a non-magnetic material; a magnetic layer formed on said substrate; a buffer layer formed on said magnetic layer, the buffer layer being made of at least one of Si, Ge, and Sn; and a protective layer formed on the buffer layer.

The invention also provides a magnetic disk medium for recording information comprising: a substrate made of a non-magnetic material; a magnetic layer formed on said substrate; a buffer layer formed on said magnetic layer, the buffer layer being made of at least one of Ti, Mo, and W; and a protective layer formed on the buffer layer.

A magnetic disk medium receives a shearing force from a magnetic head when the magnetic head slides on the magnetic disk medium in a CSS system. This shearing force is maximum on the surface of the magnetic disk medium and decreases gradually interiorly of the surface. Therefore, the area where this shearing force acts is within a certain distance from the surface.

If the protective layer thickness decreases, the area where the shearing force acts becomes closer to the interface with the magnetic layer.

The area adjacent to the magnetic layer having high in-plane internal stress is an area wherein the strain generated by interaction with the magnetic layer relaxes with increasing distance from the interface, and an area wherein in-plane strain varies continuously with the layer thickness. Since this in-plane strain is in a compression direction, the area is resistant to cracking in an in-plane direction. However, in an area where internal stress are highest, atomic or microscopic clusters are deformed in tension, as compared with an area where in-plane strain does not vary with layer thickness as shown in FIG. 2(a) and 2(b). Therefore, if a shearing force is applied to this area, bonding rupture can occur in bond A shown in FIG. 2 (b), whereupon the protective layer is damaged and wear proceeds quickly.

In the present invention, a buffer layer is formed on the magnetic layer and the buffer layer relaxes interaction from the magnetic layer, which occurs in the conventional protective layer. This brings about two advantages. FIG. 1 shows an amount of in-plane strain in relation to distance from the interface of the magnetic layer.

First, since in-plane strain caused by the above-mentioned interaction becomes small, in-plane strain is relaxed at a shorter distance from the interface than in the prior art. That is, the area wherein in-plane stress is large, is substantially reduced in the direction of layer thickness.

Second, the slope, or rate of decrease, of in-plane strain to layer thickness decreases. Therefore, improved resistance to damage by a shear force of the layer itself, in an area where in-plane internal stress is large, is obtained. A shear force generated by sliding contact with the read-out head has maximum value in the outer surface of the protective layer and decreases in the direction of the magnetic layer. Therefore, the improvement of resistance to shear damage enables the surface of the protective layer to be positioned closer to the magnetic layer. In other words, a thinner film can be achieved.

By way of terminology, the thickness of the protective layer and hence of magnetic spacing in the conventional magnetic disk medium is termed protective spacing loss. A thinner protective layer causes less protective spacing loss.

It will be noted that the protective spacing loss in the magnetic disk medium of the present invention is the combined thicknesses of the protective layer and the buffer layer. Therefore, whether protective spacing loss decreases is determined by the comparison of the thickness of only the protective layer in the conventional magnetic disk medium, versus the sum of the thickness of the protective layer and the buffer layer in the present invention.

It is found in the present invention that the thickness of the protective layer can be as thin as 3 nm if a buffer layer whose thickness is about 1 nm is provided. In this case, protective spacing loss is 4 nm. While it is impossible for the thickness of a conventional protective layer, that is, conventional protective spacing loss, to decrease to 10 nm because of degradation of CSS durability, the decrease of protective spacing loss and thereby high recording density is achieved substantially according to the invention.

Furthermore, the invention provides a magnetic disk medium wherein the sum of both of the buffer layer and the protective layer is set at 10 nm or less, and set at 4 nm or more.

Thus, the invention can function equivalently to the prior art as defined previously, as well as improve greatly on the recording density thanks to making the protective layer thinner.

Still further, the invention provides a magnetic disk medium wherein the buffer layer and the protective film are formed one after another by either a sputtering method or a CVD method.

BRIEF DESCRIPTION OF THE DRAWINGS

FIG. 9 is a table showing a head crash rate of embodiment 1–6 and a comparative example, in 20,000 CSS operations.

DESCRIPTION OF THE PREFERRED EMBODIMENTS

An embodiment of the present invention is described in the following.

Figure 1:
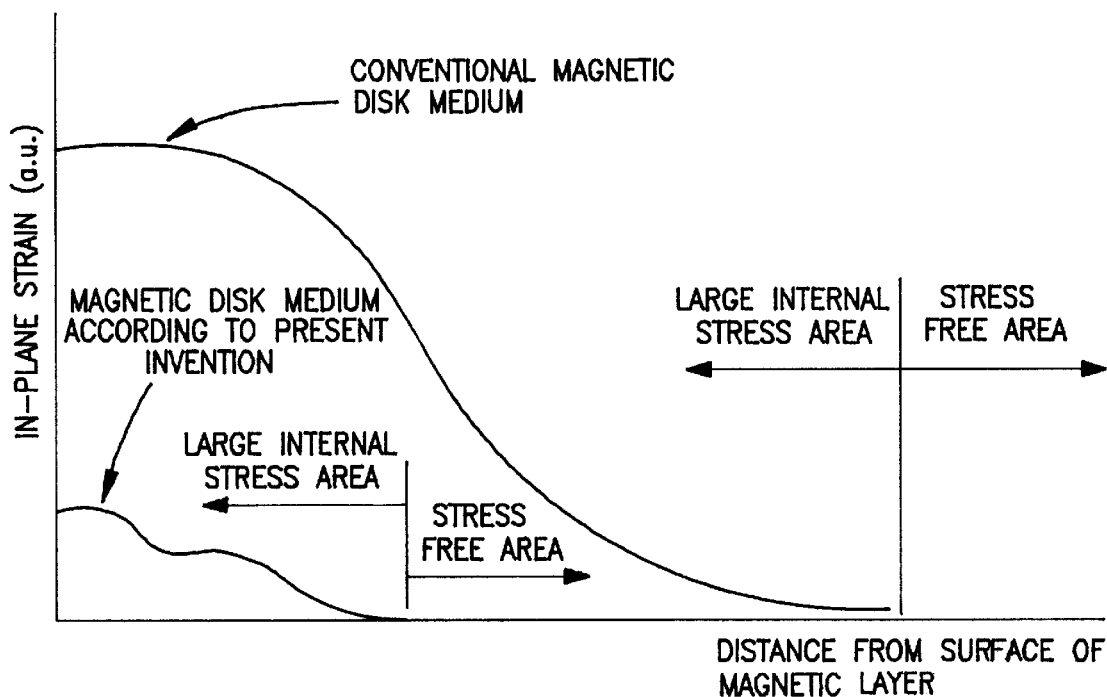
FIG. 1 is a diagram showing variation of an amount of in-plane strain in relation to distance from the surface of magnetic layer in a magnetic disk medium.
Figure 2A:
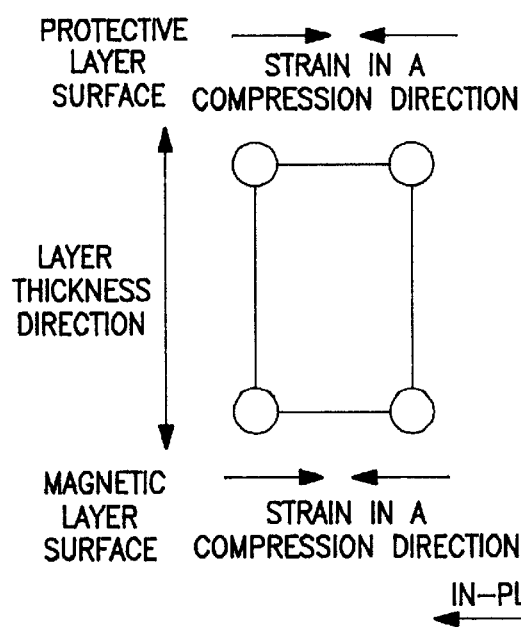
FIG. 2(a) shows a model for in-plane strain in case of no stress slope.
Figure 2B:
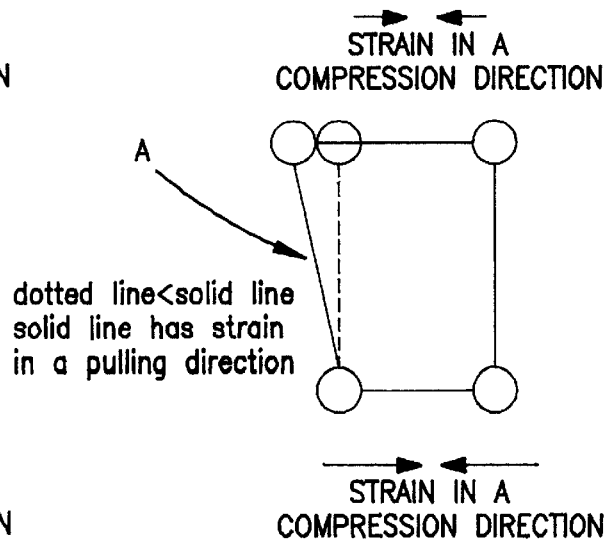
FIG. 2(b) shows a model for in-plane strain in case of significant stress slope.
Figure 3:
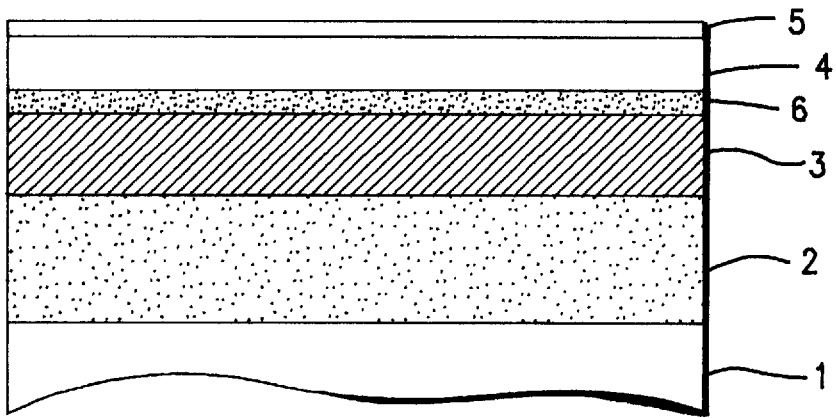
FIG. 3 is a sectional view of a part of an embodiment of a magnetic disk medium according to the present invention.

In FIG. 3, reference number 1 shows a substrate made of a non-magnetic material. An underlayer 2, a magnetic layer 3, a buffer layer 6, a protective layer 4, and a lubricant 5 are formed one after another on the substrate 1.

An Ni-P (nickel-phosphorus) plated substrate of aluminum alloy was used as a material of the substrate 1. The underlayer 2 was formed out of Cr (chromium) and the magnetic layer 3 was made of a Co-Cr-Ta (cobalt-chromium-tantalum) alloy. The buffer layer 6 was formed out of at least one of Si (silicon), Ge (germanium), Sn (tin), Ti (titanium), Mo (molybdenum) and W (tungsten). The protective layer 4 was made of hydrogen-added amorphous carbon.

These underlayer 2, magnetic layer 3, buffer layer 6, and protective layer 4 are formed consecutively one after another by a sputtering method. The lubricant 5 is formed by a dipping method.

Figure 4:
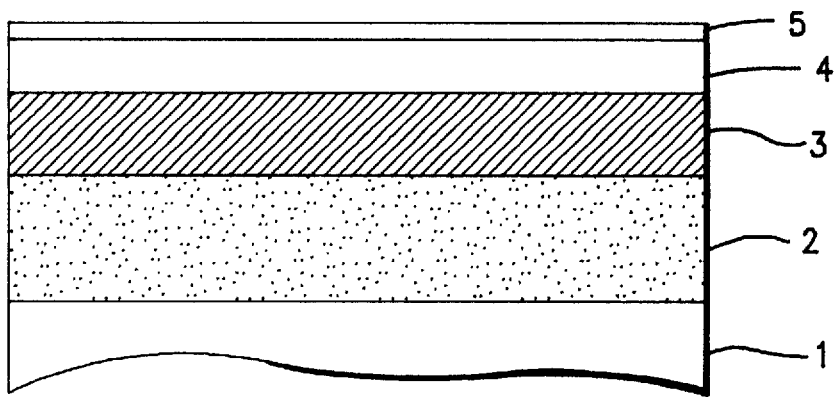
FIG. 4 is a sectional view of a part of an example of magnetic disk media according to the prior art.

In addition, a conventional magnetic disk medium for use in comparative example 1 was made in the following manner. An Ni-P plated substrate of aluminum alloy was used as a material of the substrate 1 (FIG. 4). The underlayer 2 was formed out of Cr and the magnetic layer 3 was made of a Co-Cr-Ta alloy. The protective layer 4 was made of hydrogen-added amorphous carbon. These underlayer 2, magnetic layer 3 and protective layer 4 are formed consecutively one after another by a sputtering method. The lubricant 5 is formed by a dipping method.

The CSS durability of various embodiments and comparative examples constructed as above were evaluated when protective spacing loss is changed to various values.

In these embodiments, embodiments 1, 2, 3, 4, 5 and 6 were made including a buffer layer whose thickness is 3 nm, which was made of Si, Ge, Sn, Ti, Mo, and W respectively.

As defined before, the protective spacing loss is the sum of the thickness of a buffer layer 6 and a protective layer 4 in the present invention in FIG. 3, while the protective spacing loss is the thickness of only the protective layer 4 in FIG. 4 in the conventional magnetic disk medium.

The CSS durability vs protective spacing loss was evaluated by testing whether damage to the disk medium occurred, as evidenced by so-called "head crashes", repeating CSS operations 20,000 times for the samples of embodiments 1–6 and the comparative examples 1, whose protective spacings are 14, 12, 10, 8 and 6 nm. Here, one CSS operation means one cycle including sliding contact and flying of the magnetic head on a magnetic disk medium in accordance with the start and stop of the magnetic disk medium rotation.

In the embodiments 1–6 of the present invention, all buffer layers 6 had a thickness of 3 nm. Therefore, in the samples whose thickness of protective spacing loss is 14 nm, the protective layer 5 has a thickness of 11 nm in embodiments 1, 2, 3, 4, 5 and 6 and these samples are defined as embodiments 1.1, 2.1, 3.1, 4.1, 5.1, and 6.1 respectively.

Hereafter, the samples with the protective layer whose thickness is 9 nm, and whose protective spacing loss is 12 nm, are defined as embodiment 1.2, 2.2, 3.2, 4.2, 5.2, and 6.2 respectively in the same manner. And the samples with the protective layer whose thickness is 7 nm and whose protective spacing loss is 10 nm, are defined as embodiment 1.3–6.3. And the samples with the protective layer whose thickness is 5 nm and whose protective spacing loss is 8 nm, are defined as embodiment 1.4–6.4. And the samples with the protective layer whose thickness is 3 nm and whose protective spacing loss is 5 nm, are defined as embodiment 1.5–6.5. All of the above samples were made.

On the other hand, the samples of comparative examples whose thickness of protective layer 5 is 14, 12, 10, 8 and 6 nm and whose protective spacing loss 14, 12, 10, 8 and 6 respectively were made as comparative examples 1.1., 1.2, 1.3, 1.4, and 1.5 respectively.

Results are shown in FIG. 9, which shows the rate of the above-mentioned head crash on a scale of 0 to 10. It is found in FIG. 9 that in case of the comparative examples head crash rate increased to $4/10$ at comparative examples 1.3, whose protective spacing loss is 10 nm, to $9/10$ at comparative example 1.4, and to $10/10$ at comparative example 1.5; thus, the head crash rate was nearly $10/10$ in case of less than 8 nm protective spacing loss.

On the other hand, in the embodiments of the invention, no head crash occurred in embodiments 1–6 even if protective spacing loss is decreased to 8 nm. Moreover, when protective spacing loss is decreased to 6 nm, no head crash occurred at all at embodiments 1.5, 5.5, 6.5 in which buffer layer 6 was formed by Si, Mo and W respectively. Even in embodiment 3.5, which has the highest head crash rate of all the inventive embodiments and has a buffer layer 5 formed by Sn, the crash rate was only 30%. Hence, it is confirmed that these embodiments have excellent CSS durability even if the protective spacing loss is decreased compared with comparative examples.

Secondly, the samples whose buffer layer 4 were made of Si, whose protective spacing loss are 20 nm and 5 nm, namely the thickness of buffer 6 was 2 nm and the protective layer was 18 nm, and 3 nm respectively, were made and defined as embodiment 7 and 8 respectively.

Then comparative examples, whose protective spacing loss, namely the protective layer, were 20 nm and 5 nm, were made and defined as comparative example 2 and 3 respectively.

CSS operations were performed on these samples 5,000 times, and the maximum coefficient of kinetic friction ($\mu$fmax) and a medium take-off velocity (TOV) of a magnetic disk when the magnetic head floats up from a stationary state were taken in relation to the number of CSS operations.

In general, as wear of a magnetic disk medium (protective layer) proceeds, $\mu$fmax has a tendency to increase. When $\mu$fmax increases, further wear is accelerated and failures such as head crash ultimately occurs, because the friction energy of a magnetic head and a magnetic disk medium during sliding contact increases. On the other hand, when wear proceeds slowly, TOV has a tendency to decrease slowly, but when wear proceeds rapidly, TOV does not stay constant and fluctuates markedly because of generation of wear dust and a change in sliding contact surface shape.

Figure 5A:
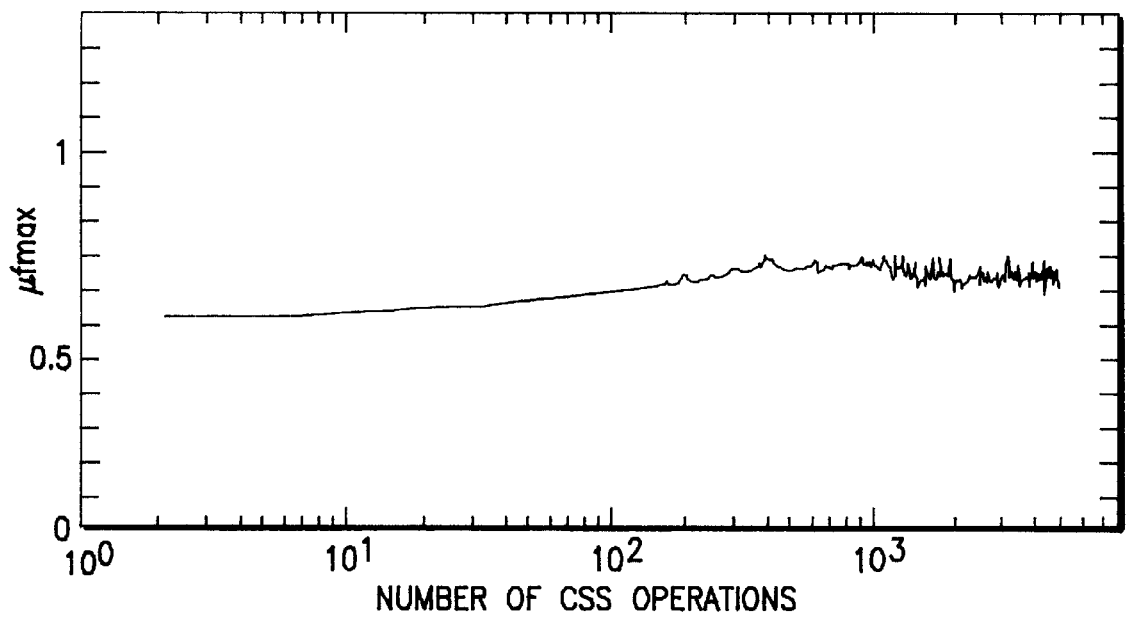
FIG. 5(a) is a diagram showing behavior of the maximum coefficient of kinetic friction ($\mu$fmax) in relation to the number of CSS operations in embodiment 7.
Figure 5B:
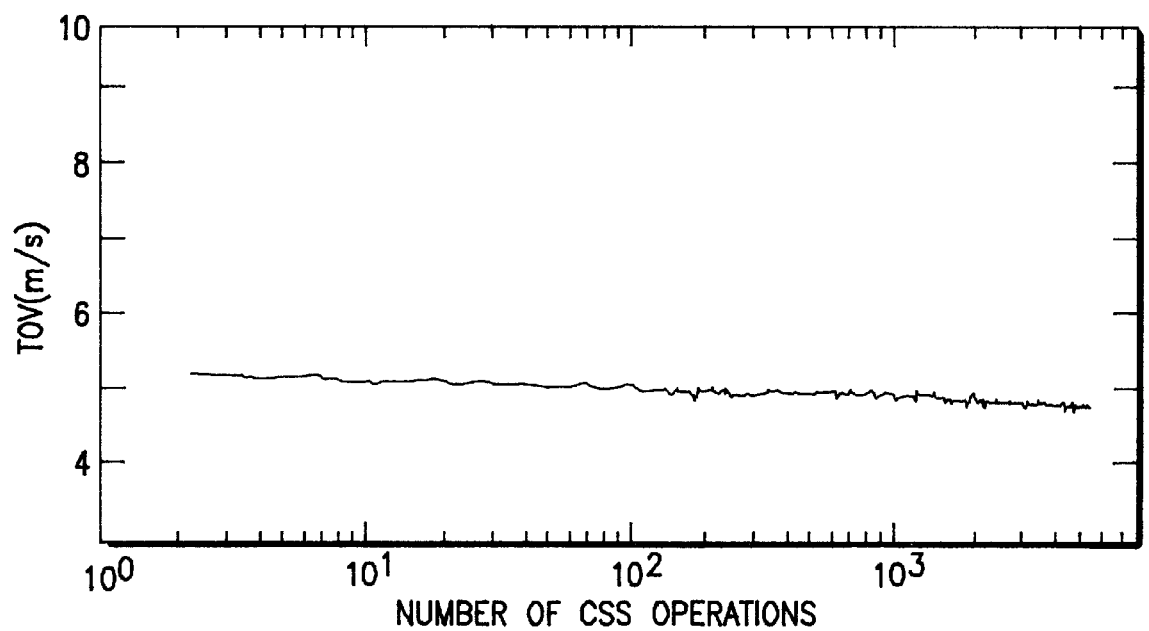
FIG. 5(b) is a diagram showing behavior of a medium take-off velocity (TOV) in relation to the number of CSS operations in embodiment 7.

FIG. 5($a$) and 6($a$) shows behavior of the maximum coefficient of kinetic friction ($\mu$fmax) of embodiment 7 and 8 respectively and FIG. 5($b$) and 6($b$) shows behavior of a medium take-off velocity (TOV) of the magnetic disk of embodiment 7 and 8 respectively.

Figure 7A:
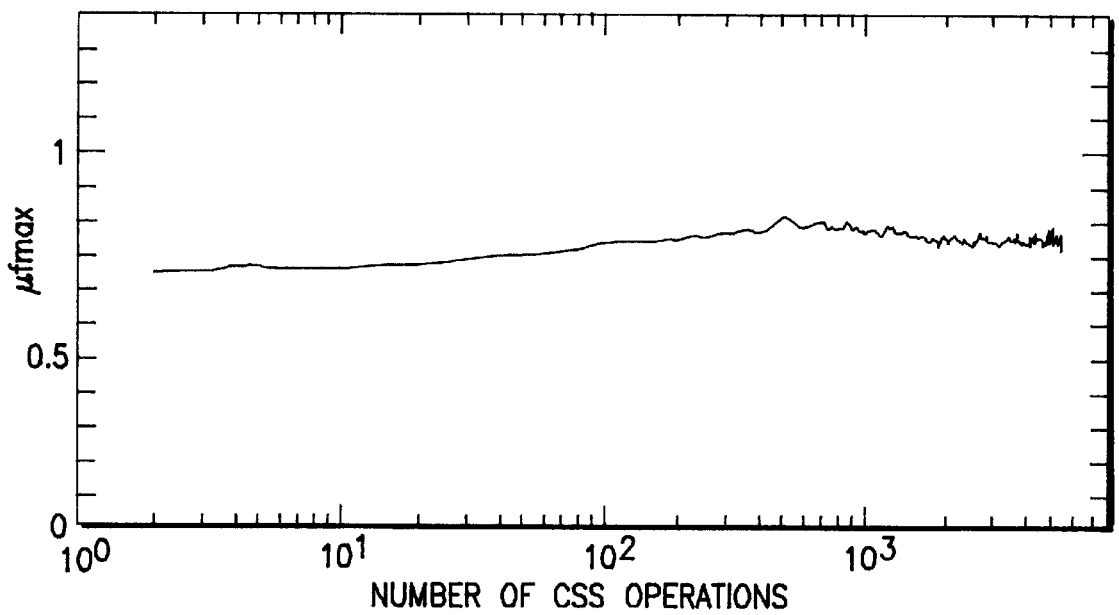
FIG. 7(a) is a diagram showing behavior of the maximum coefficient of kinetic friction ($\mu$fmax) in relation to the number of CSS operations in comparative example 2.
Figure 7B:
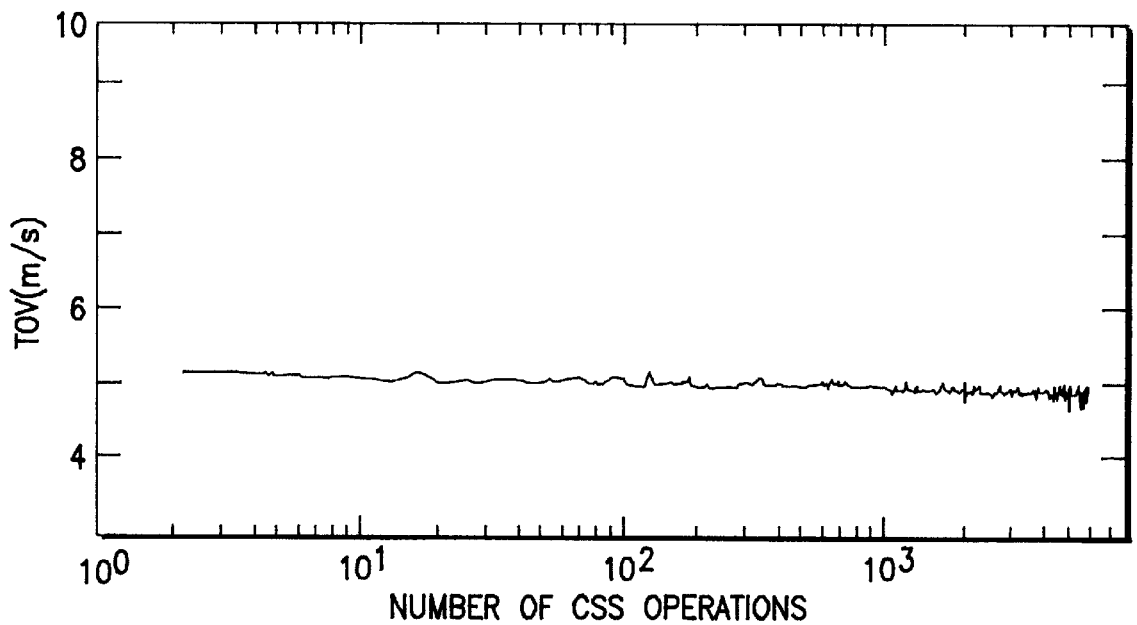
FIG. 7(b) is a diagram showing behavior of a medium take-off velocity (TOV) in relation to the number of CSS operations in comparative example 2.

FIG. 7($a$) and 8($a$) shows behavior of the maximum coefficient of kinetic friction ($\mu$fmax) of comparative example 2 and 3 respectively, and FIG. 7($b$) and 8($b$) shows behavior of a medium take-off velocity (TOV) of the magnetic disc of comparative example 2 and 3 respectively.

As a result of the 5,000 CSS operations, as clearly shown by FIGS. 5($a$), 5($b$), 7($a$), 7($b$), in case of embodiment 7 and comparative example 2 the coefficient of friction and the TOV are kept almost constant in relation to the number of CSS operations, and no head crash happened in 5,000 CSS operations. This result shows wear proceeds very slowly and good characteristics were obtained from a view point of wear durability. This is because the thickness of the protective layer of both embodiment 7 and comparative example 2 are large and a shearing force caused by sliding contact with magnetic head does not influence upon an area where internal stress is large in a protective layer.

Figure 6A:
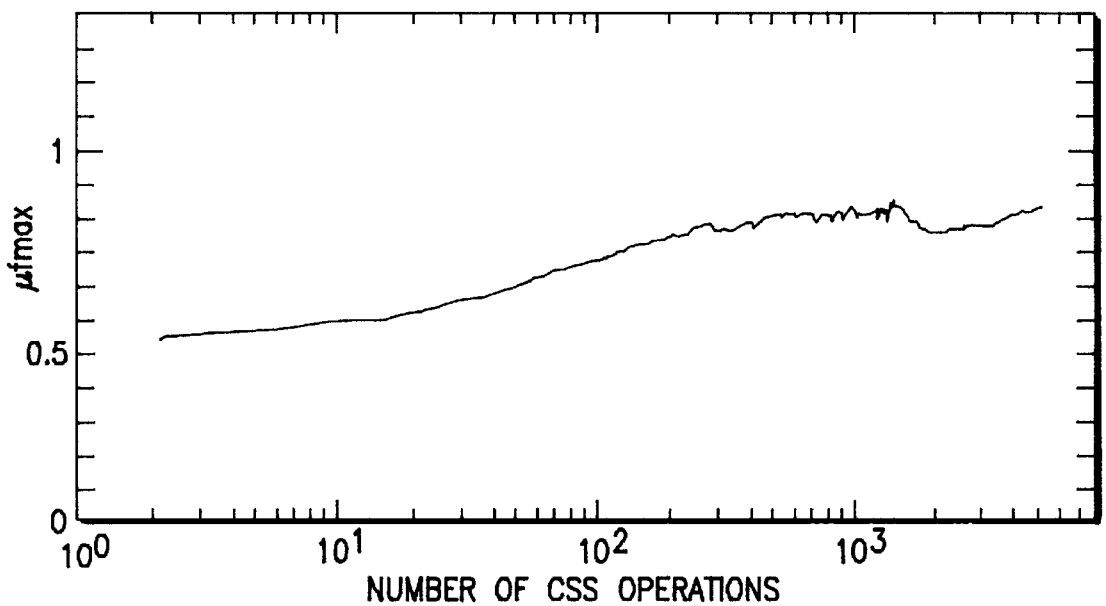
FIG. 6(a) is a diagram showing behavior of the maximum coefficient of kinetic friction ($\mu$fmax) in relation to the number of CSS operations in embodiment 8.
Figure 6B:
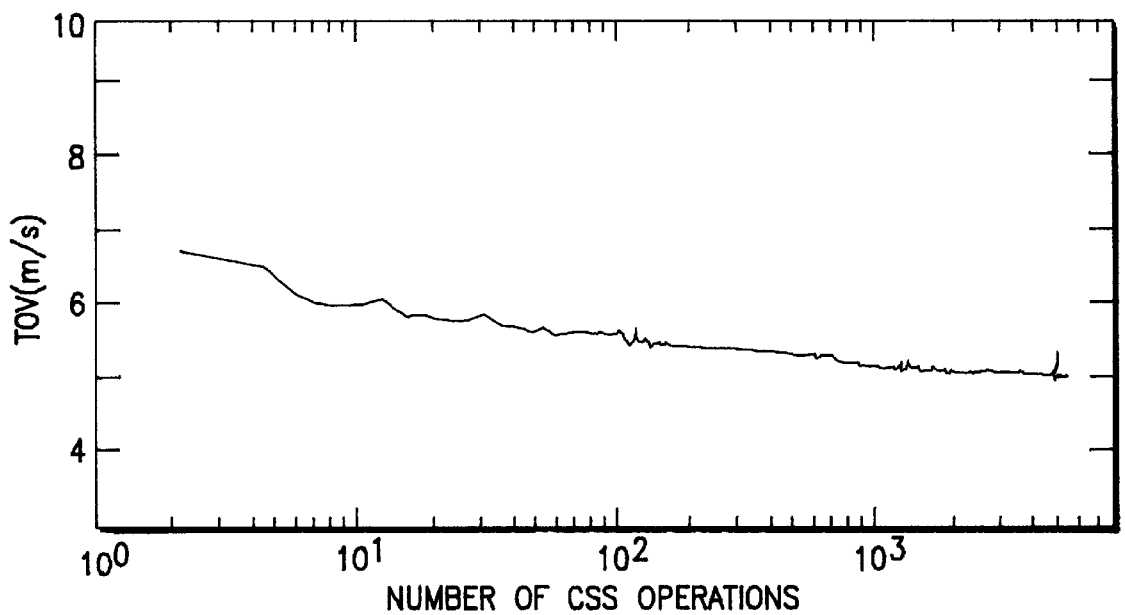
FIG. 6(b) is a diagram showing behavior of a medium take-off velocity (TOV) in relation to the number of CSS operations in embodiment 8.

In the embodiment 8 and comparative example 3 which has a protective spacing loss of 5 nm, as clearly seen from FIG. 6($a$), good characteristics are obtained, which are nearly equivalent to the embodiment 7 and comparative example 2 which have a protective layer spacing of 20 nm.

Figure 8A:
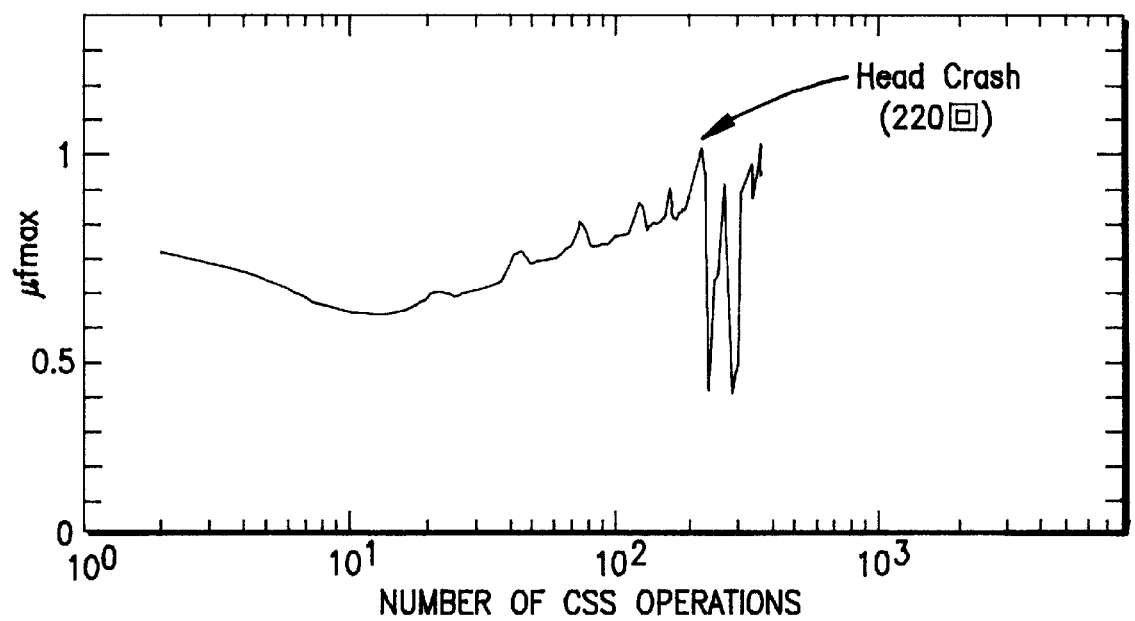
FIG. 8(a) is a diagram showing behavior of the maximum coefficient of kinetic friction ($\mu$fmax) in relation to the number of CSS operations in comparative example 3.
Figure 8B:
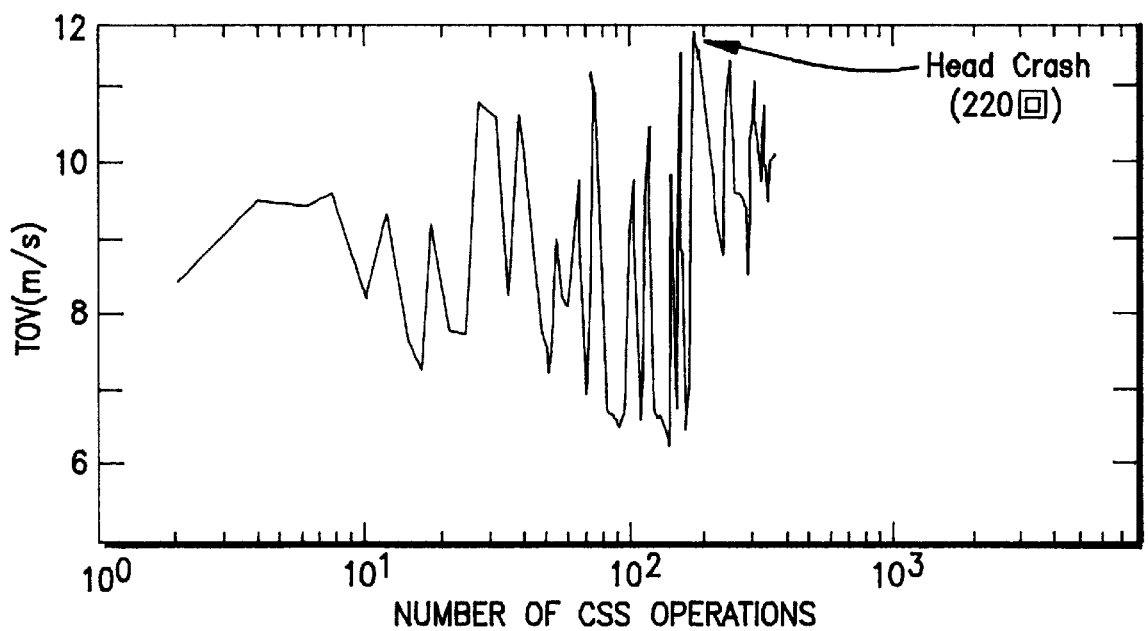
FIG. 8(b) is a diagram showing behavior of a medium take-off velocity (TOV) in relation to the number of CSS operations in comparative example 3.

On the other hand, in the comparative example 3, as seen from FIG. 8($a$), the coefficient of friction increased greatly with the increase of the number of CSS operations. And as seen from FIG. 8(b), the TOV fluctuated repeatedly and head crushes happened in a small number of CSS operations. This behavior of µfmax and TOV indicated that wear proceeds rapidly and remarkably and the proceeding form is much different than that of embodiment 7, 8 and comparative example 2.

This is because a shearing force which is generated by sliding contact with the magnetic head and damages the protective layer, reached an area where internal stress is large within the protective layer. As said before, this area is very sensitive to the action of a shearing force and easy to destroy. As a result, wearing of the protective layer was accelerated and ultimately caused head crashes.

The thickness of a buffer layer is required to be at least 1 nm, considering the atomic size of the materials employed. If the thickness is less than 1 nm, the number of atoms suspended in the layer thickness direction is less than 2–3, and it cannot be expected that internal stress of a protective layer thereon would be relaxed.

Moreover, the thickness of the protective layer should be at least 3 nm. If the thickness is less than 3 nm, the fusion of the cluster island in the initial process of layer forming is not sufficient, hence a uniform thickness of the layer cannot be achieved and the covering characteristic is spoiled, and with it the function to protect a magnetic layer from corrosion and sliding contact with a magnetic head in CSS operations. Therefore, the sum of thickness of a buffer layer and a protective layer, which is protective spacing loss in the present invention should be at least 4 nm.

By providing a buffer layer on a magnetic layer the stress, namely strain, in a protective layer due to the interaction between a magnetic layer and a protective layer, is required. As a result, good CSS durability can be achieved even if protective spacing loss is decreased to approximately 5 nm. The decrease in protective spacing loss enables overall magnetic spacing to become small and a magnetic disk medium suitable for high density recording can be achieved.

What is claimed is:

1. A magnetic disk medium for recording information comprising:
    a substrate of a non-magnetic material;
    a magnetic layer on said substrate;
    a buffer layer on said magnetic layer, said buffer layer being made of at least one of Ti, Ge and Sn; and
    a protective layer on said buffer layer.

2. A magnetic disk medium as defined in claim 1, wherein said protective layer principally comprises amorphous carbon.

3. A magnetic disk medium according to claim 1, wherein said buffer layer is made of at least one of Ti and Sn.

4. A magnetic disk medium as defined in claim 1, wherein a sum of layer thickness of said buffer layer and said a protective layer is from about 4 to about 10 nm.

5. A magnetic disk medium as defined in claim 1, wherein said buffer layer and said protective layer are formed by a sputtering method or a CVD method.

6. A magnetic disk drive comprising: a magnetic disk medium as defined in claim 1.

7. A magnetic disk medium as defined in claim 1, wherein a thickness of said buffer layer is from about 1 to about 7 nm.

8. A magnetic disk medium for recording information comprising:
    a substrate of a non-magnetic material;
    a magnetic layer on said substrate;
    a buffer layer on said magnetic layer, said buffer layer being made of at least one of Ti, Mo, W, Si, Ge and Sn; and
    a protective layer on said buffer layer,
    wherein a sum of layer thicknesses of said buffer layer and said protective layer is from about 4 to about 10 nm.

9. A magnetic disk medium as defined in claim 8, wherein said protective layer principally comprises amorphous carbon.

10. A magnetic disk medium according to claim 8, wherein said buffer layer is made of at least one of Ti, Mo, and W.

11. A magnetic disk medium as defined in claim 8, wherein said buffer layer and said protective layer are formed by a sputtering method or a CVD method.

12. A magnetic disk drive comprising: a magnetic disk medium as defined in claim 8.

13. A magnetic disk medium as defined in claim 8, wherein a thickness of said buffer layer is from about 1 to about 7 nm.

14. A magnetic disk medium according to claim 3, wherein said buffer layer is made of Ti.

15. A magnetic disk medium for recording information comprising:
    a non-magnetic substrate;
    a magnetic layer on said substrate;
    a buffer layer on said magnetic layer, said buffer layer having a thickness of 1 to 7 nm; and
    a protective layer on said buffer layer, said protective layer having a thickness of 3 to 9 nm.

16. The medium of claim 15, wherein said buffer layer comprises at least one of Ti, Mo, W, Si, Ge and Sn.

17. The medium of claim 16, wherein said buffer layer comprises Ti.

18. The medium of claim 15, wherein a combined thickness of said buffer layer and said protective layer is 4 to 10 nm.

* * * * *